(12) United States Patent
Wright et al.

(10) Patent No.: US 9,857,276 B2
(45) Date of Patent: Jan. 2, 2018

(54) WHEEL ASSEMBLY AND VEHICLE MODEL WITH WHEEL ASSEMBLY

(71) Applicant: Auto Research Center, LLC, Indianapolis, IN (US)

(72) Inventors: Michael Wright, Zionsville, IN (US); Andrew Gunselman, Indianapolis, IN (US)

(73) Assignee: Auto Research Center, LLC, Indianapolis, IN (US)

( * ) Notice: Subject to any disclaimer, the term of this patent is extended or adjusted under 35 U.S.C. 154(b) by 164 days.

(21) Appl. No.: 15/000,506

(22) Filed: Jan. 19, 2016

(65) Prior Publication Data
US 2016/0209296 A1    Jul. 21, 2016

Related U.S. Application Data

(60) Provisional application No. 62/104,909, filed on Jan. 19, 2015.

(51) Int. Cl.
| | |
|---|---|
| *G01M 17/02* | (2006.01) |
| *B60B 19/00* | (2006.01) |
| *G01M 9/06* | (2006.01) |
| *G01M 17/013* | (2006.01) |
| *B60B 21/12* | (2006.01) |
| *B60C 99/00* | (2006.01) |
| *B60C 11/03* | (2006.01) |
| *B60C 11/01* | (2006.01) |
| *B60C 13/00* | (2006.01) |

(52) U.S. Cl.
CPC ............. *G01M 17/02* (2013.01); *B60B 19/00* (2013.01); *B60B 21/12* (2013.01); *B60C 99/00* (2013.01); *G01M 9/06* (2013.01); *G01M 17/013* (2013.01); *B60B 2900/331* (2013.01); *B60B 2900/351* (2013.01); *B60B 2900/551* (2013.01); *B60C 11/01* (2013.01); *B60C 11/03* (2013.01); *B60C 11/0332* (2013.01); *B60C 13/003* (2013.01)

(58) Field of Classification Search
None
See application file for complete search history.

(56) References Cited

U.S. PATENT DOCUMENTS

| | | | | |
|---|---|---|---|---|
| 4,815,004 | A * | 3/1989 | Beebe ................. | G01M 17/022 377/17 |
| 5,103,595 | A * | 4/1992 | Dale ...................... | G01M 1/30 451/11 |
| 2005/0268707 | A1* | 12/2005 | Dale ................... | G01M 17/027 73/146 |
| 2012/0312608 | A1* | 12/2012 | Baumgartner ....... | B60K 7/0007 180/62 |
| 2013/0207446 | A1* | 8/2013 | Marro .................. | B60K 7/0007 301/6.5 |
| 2015/0231918 | A1* | 8/2015 | Frum ..................... | B60B 11/02 475/231 |

\* cited by examiner

*Primary Examiner* — Andre Allen
(74) *Attorney, Agent, or Firm* — Ice Miller LLP

(57) ABSTRACT

The present embodiments provide a wheel assembly having a dynamic structure to influence an unloaded profile of a tire. In one embodiment the unloaded profile is also influenced by a centrifugal force on the wheel assembly and an inflation pressure of the tire. In one embodiment, a loaded profile of the tire is influenced by a weight of the wheel assembly, the inflation pressure of the tire, and the centrifugal force on the wheel assembly.

20 Claims, 6 Drawing Sheets

WHEEL ASSEMBLY AND VEHICLE MODEL WITH WHEEL ASSEMBLY

CROSS-REFERENCE TO RELATED APPLICATIONS

The present application is a non-provisional of, and claims priority to, U.S. Provisional Patent Application Ser. No. 62/104,909, filed Jan. 19, 2015 and titled QUASI-PNEUMATIC SCALE VEHICLE TIRES.

TECHNICAL BACKGROUND OF THE DISCLOSED EMBODIMENTS

The embodiments herein generally relate to vehicle models and, more particularly, to for a wheel assembly and a vehicle model with a wheel assembly.

BACKGROUND OF THE DISCLOSED EMBODIMENTS

Vehicle models are often tested in wind tunnels to test the aerodynamics of the vehicle. The models generally include scale tires mounted to wheels that are joined to an axle of the model. The scale tires rotate on a moving belt positioned on a floor of the wind tunnel. The belt is operated at approximately the same speed as the airflow through the wind tunnel. Typically, the scale tires are formed from a material such as hollow aluminum or hollow carbon fiber. Unfortunately, such tires require a uniform profile around the circumference of the tire. A uniform profile does not accurately match the tire profile of a full sized vehicle. In particular, on a full sized vehicle, an unloaded portion of the tire (the portion of the tire that is not in contact with the ground) has a narrow profile while the loaded portion of the tire (the portion of the tire in contact with the ground) bulges due to the weight of the vehicle and has a wider profile. Scale tires having a uniform profile are incapable of properly replicating the profile of a full size tire because the loaded and unloaded portions of the scale tire always have the same profile. Generally, the uniform profile selected for the scale tire is between the profile of a loaded tire and the profile of an unloaded tire. Because scale tires cannot properly replicate the actual profile of a full size tire, the data collected from the scale model in the wind tunnel may have significant inaccuracies.

Generally, known pneumatic tires are mounted so that the tires are pulled down through an external wheel arm that applies a load to the wheel/tire to achieve the tire bulge required. The wheel arm system is typically secured to a yaw table that will yaw with the model and the rolling road. In addition, because of the load being applied to the belt through these tires, a system such as a roller system is typically used underneath the belt to support the force applied by the tires to the belt and thus eliminate issues such as belt burn or melting of the belt. This makes the ability of running pneumatic tires limited to specific facilities that have additional costly upgrades: wheel arm loading system, yawing table that incorporates the rolling road; and underneath-the-belt roller system to support the top side wheel loadings.

A need remains for a scale tire having dynamic characteristics that change based on loading conditions without the need for costly upgrades to the wind tunnel.

SUMMARY OF THE DISCLOSED EMBODIMENTS

In one embodiment, a wheel assembly is provided having a dynamic structure to influence the unloaded profile of a tire, wherein the unloaded profile is also influenced by a centrifugal force on the wheel assembly and an inflation pressure of the tire, wherein the loaded profile of the tire is influenced by a weight of the wheel assembly, the inflation pressure of the tire, and the centrifugal force on the wheel assembly.

In one embodiment, a wheel assembly is provided, wherein the deformed cross-sectional shape of the tire substantially replicates that of the full sized tire being modeled when revolving at test speed.

In one embodiment, a wheel assembly is provided, wherein the deformed cross-sectional shape of both the loaded and unloaded portion of the tire substantially replicates that of the full sized tire being modeled when revolving at test speed.

In one embodiment, a wheel assembly is provided, wherein the tire sidewall bulge, induced by normal load, substantially replicates the full sized tire being modeled.

In one embodiment, a wheel assembly is provided, wherein a tire contact patch of the tire deforms to maintain contact with the belt over at least a portion of the tread width of the tire.

In one embodiment, a wheel assembly is provided, wherein the loaded radius of the tire substantially replicates that of a full sized tire fitted to a real vehicle.

In one embodiment, a wheel assembly is provided, wherein the tire shoulder profiles and tread patterns of the tire approximately replicate the tire shoulder profiles and tread patterns of the full sized tire being modeled.

In one embodiment, a wheel assembly is provided, wherein the tire allows the vehicle model to be yawed relative to the belt, wherein in the yawed condition there is relative lateral motion (i.e. scrub) between the tire and the belt, wherein the model can be yawed on both textured and smooth belts.

In one embodiment, a wheel assembly is provided, wherein an inflation pressure of the tire can be varied by external means and maintained during a test.

In one embodiment, a wheel assembly is provided that can revolve at speeds of up to 4000 rpm.

Other embodiments are also disclosed.

BRIEF DESCRIPTION OF DRAWINGS

The embodiments described herein and other features, advantages and disclosures contained herein, and the manner of attaining them, will become apparent and the present disclosure will be better understood by reference to the following description of various exemplary embodiments of the present disclosure taken in conjunction with the accompanying drawing, wherein.

DETAILED DESCRIPTION OF THE DISCLOSED EMBODIMENTS

Figure 1:
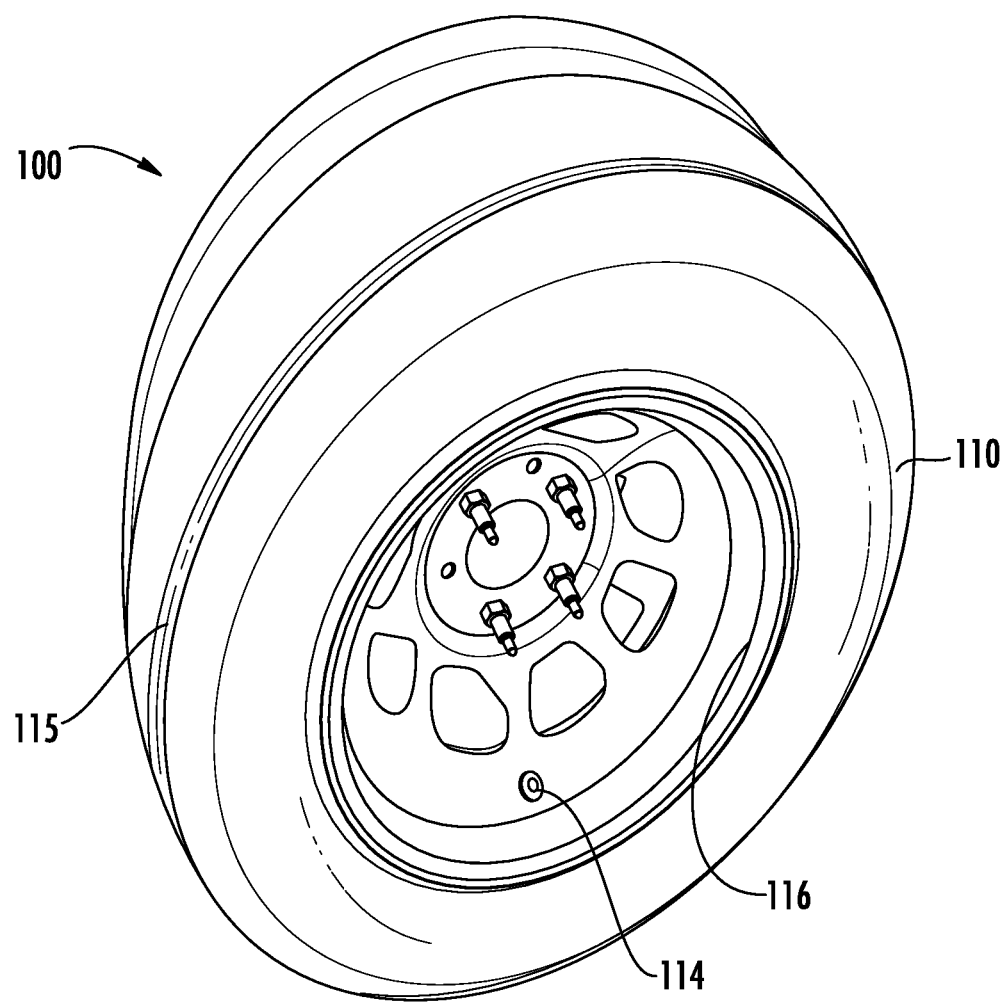
FIG. 1 is a perspective view of a wheel assembly formed in accordance with an embodiment.
Figure 2:
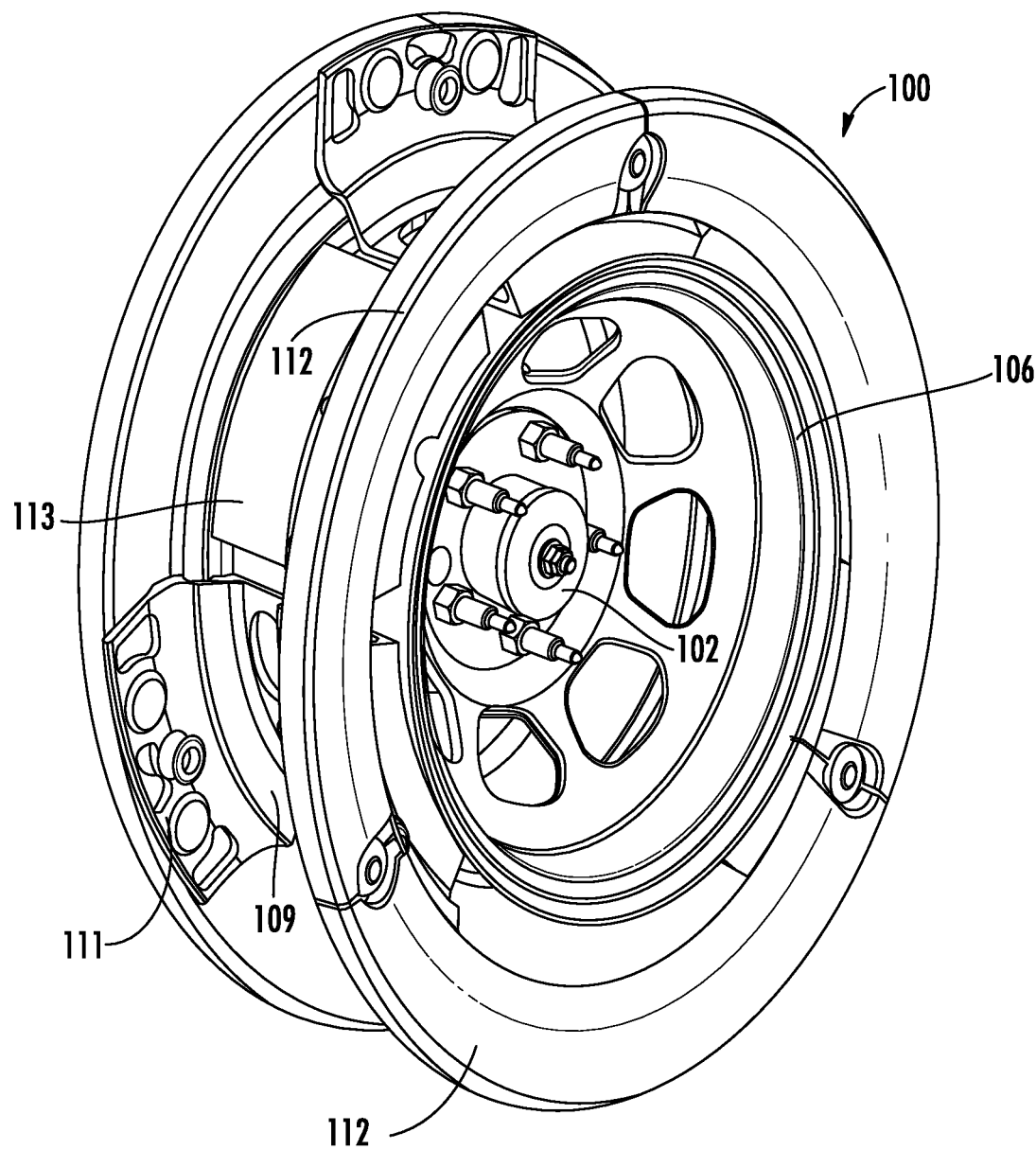
FIG. 2 is a perspective view of a wheel assembly formed in accordance with an embodiment without the tire.
Figure 3:
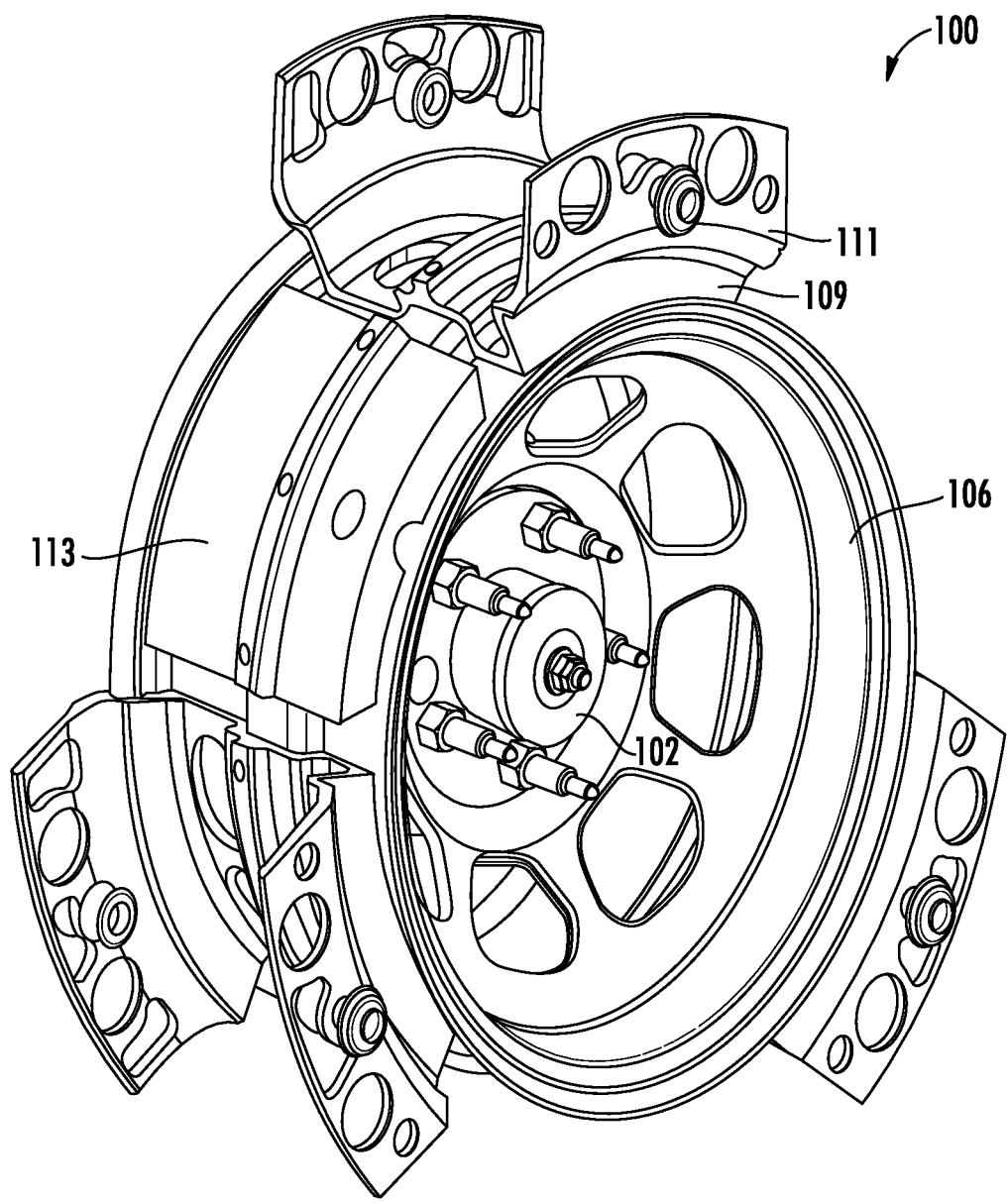
FIG. 3 is a perspective view of a wheel assembly formed in accordance with an embodiment without the tire or dynamic structure.
Figure 4:
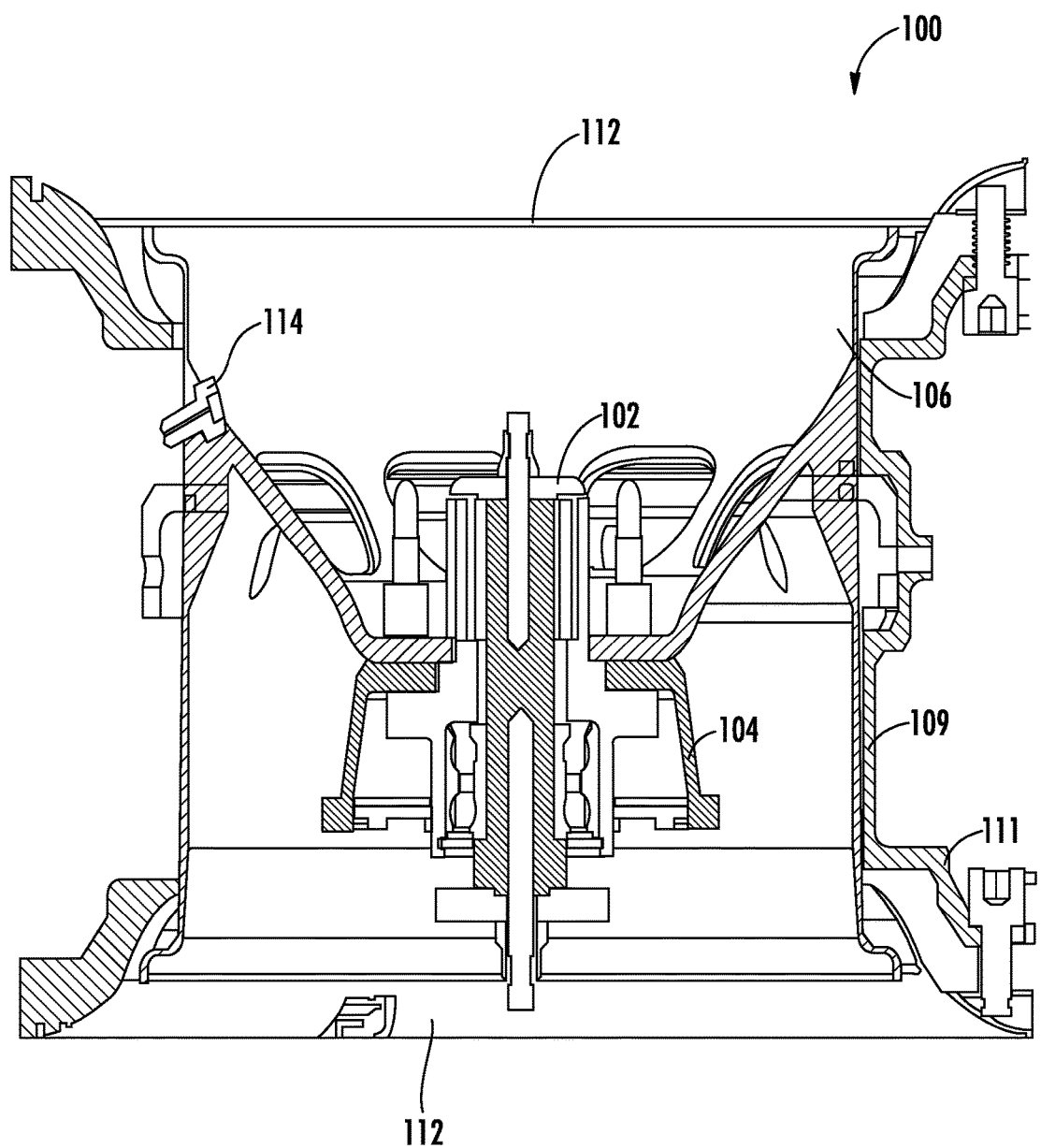
FIG. 4 is a cross-sectional view of a wheel assembly formed in accordance with an embodiment.
Figure 5:
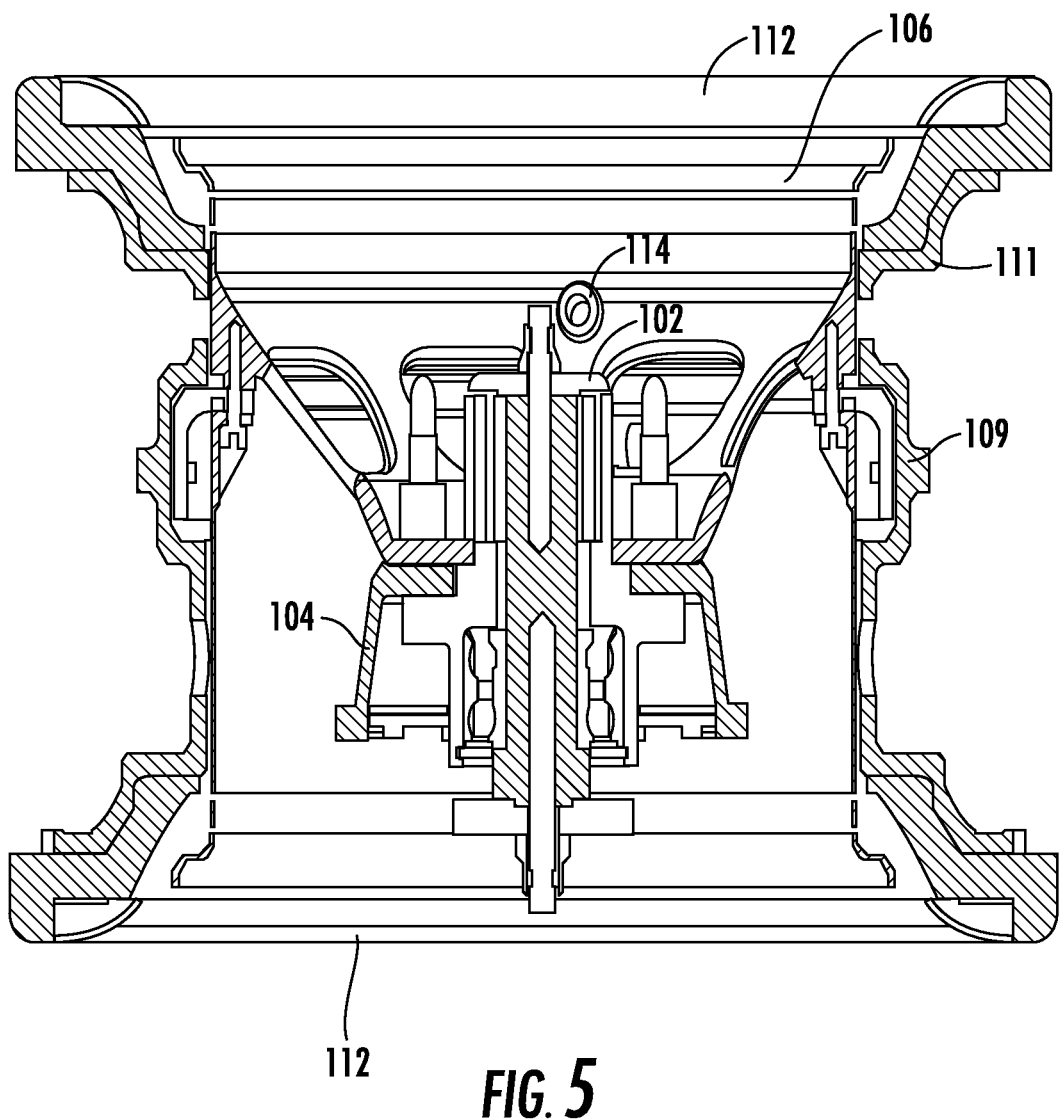
FIG. 5 is a cross-sectional view of a wheel assembly formed in accordance with an embodiment.

The features and advantages of this disclosure, and the manner of attaining them, will be more apparent and better understood by reference to the following descriptions of the disclosed methods and systems, taken in conjunction with the accompanying drawings. The components in the figures are not necessarily to scale, emphasis instead being placed upon illustrating the principles of the disclosure. Moreover, in the figures, like referenced numerals designate corresponding parts throughout the different views, but not all reference numerals are shown in each of the figures.

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended. Alterations and modifications in the illustrated device, and further applications of the principles of the invention as illustrated therein, as would normally occur to one skilled in the art to which the invention relates are contemplated, are desired to be protected. Such alternative embodiments require certain adaptations to the embodiments discussed herein that would be obvious to those skilled in the art.

Figure 6:
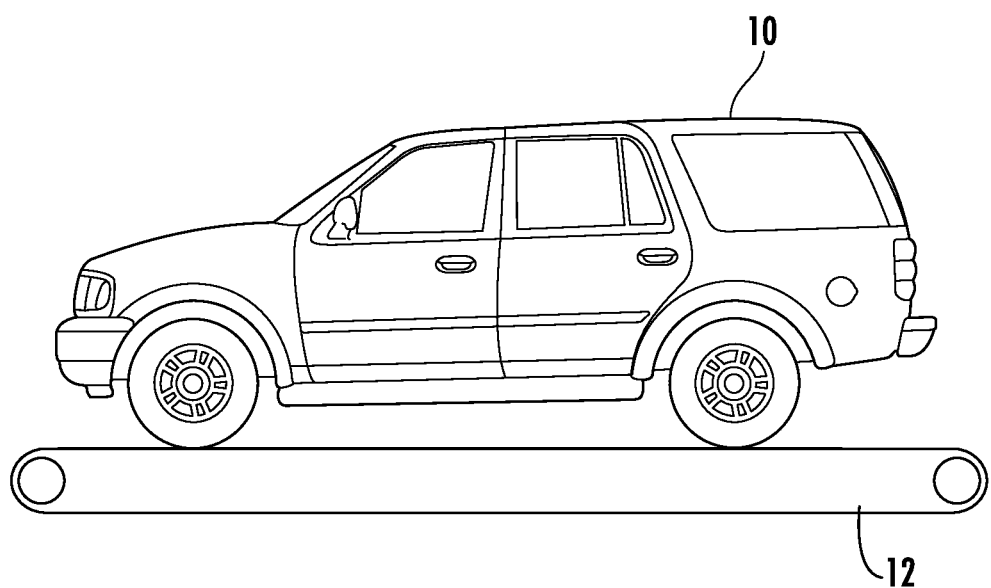
FIG. 6 is a schematic view of a model vehicle on a belt in accordance with an embodiment.

FIGS. 1-5 illustrate a wheel assembly 100 that replicates the dynamic characteristics of real tires on a full size vehicle. The wheel assembly 100 is utilized with a scale model vehicle 10 (shown in FIG. 6) in a wind tunnel (not shown). The wind tunnel includes a belt 12 (shown in FIG. 6) upon which the wheel assembly 100 rotates. The belt 12 is rotated at a speed that is approximately equivalent to the speed of the wind in the wind tunnel. The wheel assembly 100 rotates along the belt 12 as the belt 12 moves. The wheel assembly 100 may be a scale model of a real tire operating under pre-determined conditions. Physical dimensions of the real tire are scaled down to determine the appropriate tire profile for the wheel assembly 100.

The wheel assembly 100 includes a hub 102. The hub 102 is joined to an axle (not shown) of the vehicle model 10. A brake rotor top 104 extends from the hub 102 to attach to a brake rotor (not shown) of the vehicle model 10. A rim 106 extends outward from the hub 102. The rim 106 supports a tire 110, which is discussed in more detail below.

At least one mounting structure 109 is secured to the rim 106 of the wheel assembly 100. The mounting structure 109 includes at least one flange 111 that extends radially outward from the rim 106. A dynamic structure 112 is coupled to the flange 111 of the mounting structure 109. In the illustrated embodiment, three dynamic structures 112 form a continuous or semi-continuous structure around the rim 106 of the wheel assembly 100. In other embodiments, any number of dynamic structures 112, including a single dynamic structure 112, may form a continuous or semi-continuous structure around the rim 106 of the wheel assembly 100. In the illustrated embodiment, each of the three dynamic structures 112 is mounted to at least one mounting structure 109, such as by bolts coupling each end of the dynamic structure 112 to a mounting structure 109. In the illustrated embodiment, a mounting structure 109 is positioned at the intersection of each pair of dynamic structures 112. Each mounting structure 109 is coupled to a dynamic structure 112 and an adjacent dynamic structure 112. In one embodiment, the dynamic structures 112 are customized to a particular full size tire being modeled. In particular, the dynamic structures 112 are customized to replicate the tire profile of a full sized tire, as discussed below. In one embodiment, weights 113 may be secured to the rim 106 between the mounting structures 109. Additionally, in one embodiment, ballast weights (not shown) may be added to the mounting structure 109.

A tire 110 is joined to the rim 106 of the wheel assembly 100. The tire 110 is beaded so that it joins to the rim 106 in the same or analogous manner as a full sized beaded tire, wherein the beaded portion of the tire 110 is retained by the rim 106. In one embodiment, the beaded portion of the tire 110 is positioned over the dynamic structure 112 and secured between the rim 106 and the dynamic structure 112. In one embodiment, the tire 110 is formed from natural or synthetic rubber or the like and is inflatable. In one embodiment, the tire 110 is tubeless. A pressure of the tire can be altered through a charging bolt 114 formed in the wheel assembly 100. The charging bolt 114 includes a valve that receives a hypodermic needle (not shown) to inflate or deflate the tire 110. In one embodiment, the tire 110 is inflated to a lower pressure relative to a full sized tire.

The dynamic structures 112 have a shape that influences an unloaded tire profile of the tire 110. In particular, the unloaded portion of the tire 110 (the portion that is not in contact with the belt 12) has a profile that replicates the narrow profile of the unloaded portion of the full sized tire being modeled. The narrow profile of the unloaded portion of the tire 100 is maintained by the dynamic structures 112. Particularly, the dynamic structures 112 interact with the sidewalls 115 of the tire 110 to prevent the sidewalls from collapsing. Additionally, the narrow profile of the unloaded portion of the tire 110 is shaped by the centrifugal force caused by the rotation of the wheel assembly 100 during testing. For example, the centrifugal force on the tire 110 may cause the sidewalls 115 of the tire 110 to expand radially outward. As this expansion occurs, the dynamic structures 112 support the sidewalls 115 and prevent collapse thereof, while maintaining a shape of the sidewall 115 that replicates the sidewall shape of the tire being modeled. When modeling different full sized tires under varying conditions, the dynamic structures 112 of the wheel assembly 100 are modified to replicate the unloaded profile of the full sized tire being modeled.

The tire 110 includes a loaded profile (profile of the portion of the tire 110 in contact with the belt 12) that replicates the loaded profile of the full sized tire being modeled. The loaded profile of the tire 110 is altered by an amount of tire inflation and a weight of the wheel assembly 100. In particular, the amount of tire inflation and the weight of the wheel assembly 100 are altered so that the loaded profile of the tire 110 bulges and substantially replicates the loaded profile of the full sized tire being modeled. Since the weight of vehicle model 10 is supported by a strut (not shown), weight is added to the wheel assembly 100 by adding ballast weights (not shown) to the rim 106 of the wheel assembly 100. Each portion of the tire 110 dynamically changes between the loaded profile and the unloaded profile as the wheel assembly 100 rotates.

In one embodiment, the deformed cross-sectional shape of the tire 110 substantially replicates that of the full sized tire being modeled when revolving at test speed. In one embodiment, the deformed cross-sectional shape of both the loaded and unloaded portion of the tire 110 substantially replicates that of the full sized tire being modeled when revolving at test speed. In one embodiment, the tire sidewall bulge, induced by normal load, substantially replicates the full sized tire being modeled. In one embodiment, a tire contact patch of the tire 110 deforms to maintain contact with the belt 12 over at least a portion of the tread width of the tire 110. In one embodiment, the loaded radius of the tire 110 substantially replicates that of a full sized tire fitted to a real vehicle. In one embodiment, the tire shoulder profiles and tread patterns of the tire 110 substantially replicate the tire shoulder profiles and tread patterns of the full sized tire being modeled. In an embodiment, the tire 110 allows the vehicle model 10 to be yawed relative to the belt 12. In the yawed condition there is relative lateral motion (i.e. scrub) between the tire 110 and the belt 12. In one embodiment, inflation pressure can be varied by external means and maintained during a test. In one embodiment, the wheel assembly 100 can revolve at speeds of up to 4000 rpm.

The wheel assembly 100 described above enables a loaded portion of the tire 110 (portion in contact with the belt 12) and an unloaded portion of the tire 110 (portion diametrically opposite the loaded portion) to maintain dynamic cross-sectional shapes, while the wheel assembly 100 rotates, that are influenced and determined by different, unrelated, parameters. The wheel assembly 100 incorporates a dynamic structure 112 inside the tire 110 having a shape that can be modified so as to influence a profile of the tire 110 in the unloaded condition, (i.e. at the top). The dynamic structure 112 has no effect on the shape of the loaded portion of the tire (i.e. the contact patch and sidewall bulges), which profile is influenced by the tire construction, normal load, and pressure. Because the weight of a vehicle model 10 is not supported on its wheels, but rather by the support strut attached directly to the vehicle model's 10 chassis, the wheel assembly 100 enables increasing the weight of the wheel assembly 100 itself. This is achieved by the mounting structure 109 doubling as ballast, by adding ballast weights, and by the choice of material used in wheel assembly 100 construction.

The profile of the tire 110 is influenced by a weight applied to the tire 110. Because the model is retained by a support strut, the only weight applied to tire 110 is "unsprung" weight, which includes any weight that is not entirely supported by the suspension (not shown), for example the weight of the wheel assembly 100 and/or a portion of the weight of the suspension itself. The weight of the model itself it not applied to the tire 110, but rather, is retained by the support strut. By adding weight to the wheel assembly either through the materials used to construct the wheel assembly 100 and/or through adding ballast weights, the profile of the tire 110 can be altered despite the weight of the model being carried by the support strut. In one embodiment, weight is added to the wheel assembly 100 so that the weight is transferred to the tire patch, i.e. the portion of the tire in contact with the ground. Additionally, weight may be added to a portion of the suspension. In particular, a portion of the suspension's weight from the portion of the suspension closest to the wheel assembly 100 may be retained by the tire 110. In one embodiment, adding "unsprung" weight to the tire 110 replicates the "sprung" weight, i.e. vehicle and passenger weight, that is induced on the tire of a full sized vehicle.

The wheel assembly 100 eliminates the need for a wheel arm loading system because the tires are loaded through the natural weights of the suspension and additional components. The design and construction of the wheel assembly 100 also allows for less loading to be necessary than what is typically required for known pneumatic tire designs. The wheel assembly 100 is also incorporated into the model vehicle design without any addition of articles that would not be part of the normal vehicle, for example wheel arms. Therefore, the wheel assembly 100 is yawed with the model and not a yaw table. A yaw table is not required for use with the wheel assembly 100. The wheel assembly 100 is incorporated into the model design without additional articles that would create improper aerodynamic flow disruptions around the model. Additionally, the wheel assembly 100 does not require an under-the-belt roller system to protect the belt 12. Accordingly, the wheel assembly 100 can be used in any wind tunnel that has a rolling road and eliminates additional costly wind tunnel upgrades.

While this disclosure has been described using disclosed embodiments, the systems and methods according to the present disclosure can be further modified within the scope and spirit of this disclosure. This application is therefore intended to cover any variations, uses, or adaptations of the disclosure using its general principles. For example, the methods disclosed herein and in the appended claims represent one possible sequence of performing the steps thereof. A practitioner may determine in a particular implementation that a plurality of steps of one or more of the disclosed methods may be combinable, or that a different sequence of steps may be employed to accomplish the same results. Each such implementation falls within the scope of the present disclosure as disclosed herein and in the appended claims. Furthermore, this application is intended to cover such departures from the present disclosure as come within known or customary practice in the art to which this disclosure pertains and which fall within the limits of the appended claims.

The invention claimed is:

1. A wheel assembly comprising:
   a hub;
   a rim extending outward from the hub;
   a dynamic structure coupled to the rim; and
   a tire coupled to the rim, wherein a beaded portion of the tire is positioned over the dynamic structure and secured between the rim and the dynamic structure,
   wherein the dynamic structure is constructed and arranged to influence an unloaded profile of the tire, and
   wherein a loaded profile of the tire is influenced by a weight of the wheel assembly.

2. The wheel assembly of claim 1, wherein the unloaded profile is further influenced by at least one of a centrifugal force on the wheel assembly or an inflation pressure of the tire.

3. The wheel assembly of claim 1, wherein the loaded profile is further influenced by at least one of a centrifugal force on the wheel assembly or an inflation pressure of the tire.

4. The wheel assembly of claim 1, wherein the deformed cross-sectional shape of both the loaded and unloaded portion of the tire substantially replicates a full sized tire being modeled when revolving at test speed.

5. The wheel assembly of claim 1, wherein a tire sidewall bulge, induced by normal load, substantially replicates a full sized tire being modeled.

6. The wheel assembly of claim 1, wherein a tire contact patch of the tire deforms to maintain contact with a surface with which the wheel assembly is in contact over at least a portion of a tread width of the tire.

7. The wheel assembly of claim 1, wherein a loaded radius of the tire substantially replicates a full sized tire fitted to a vehicle.

8. The wheel assembly of claim 1, wherein tire shoulder profiles and tread patterns of the tire substantially replicate tire shoulder profiles and tread patterns of a full sized tire being modeled.

9. The wheel assembly of claim 1, wherein the tire allows a vehicle model to be yawed relative to a surface with which the wheel assembly is in contact, wherein in a yawed condition there is relative lateral motion between the tire and the surface.

10. The wheel assembly of claim 1, wherein an inflation pressure of the tire can be varied by external means and maintained during a test.

11. A vehicle model comprising:
an axle; and
a wheel assembly coupled to the axle and comprising:
- a hub coupled to the axle;
- a rim extending outward from the hub;
- a dynamic structure coupled to the rim; and
- a tire coupled to the rim, wherein a beaded portion of the tire is positioned over the dynamic structure and secured between the rim and the dynamic structure,
wherein the dynamic structure is constructed and arranged to influence an unloaded profile of the tire, and
wherein a loaded profile of the tire is influenced by a weight of the wheel assembly.

12. The vehicle model of claim 11, wherein the unloaded profile is further influenced by at least one of a centrifugal force on the wheel assembly or an inflation pressure of the tire.

13. The vehicle model of claim 11, wherein the loaded profile is further influenced by at least one of a centrifugal force on the wheel assembly or an inflation pressure of the tire.

14. The vehicle model of claim 11, wherein the deformed cross-sectional shape of both the loaded and unloaded portion of the tire substantially replicates a full sized tire being modeled when revolving at test speed.

15. The vehicle model of claim 11, wherein a tire sidewall bulge, induced by normal load, substantially replicates a full sized tire being modeled.

16. The vehicle model of claim 11, wherein a tire contact patch of the tire deforms to maintain contact with a surface with which the wheel assembly is in contact over at least a portion of a tread width of the tire.

17. The vehicle model of claim 11, wherein a loaded radius of the tire substantially replicates a full sized tire fitted to a vehicle.

18. The vehicle model of claim 11, wherein tire shoulder profiles and tread patterns of the tire approximately replicate tire shoulder profiles and tread patterns of a full sized tire being modeled.

19. The vehicle model of claim 11, wherein the tire allows a vehicle model to be yawed relative to a surface with which the wheel assembly is in contact, wherein in a yawed condition there is relative lateral motion between the tire and the surface.

20. The vehicle model of claim 11, wherein an inflation pressure of the tire can be varied by external means and maintained during a test.

* * * * *